(12) United States Patent
Harada et al.

(10) Patent No.: US 11,294,173 B2
(45) Date of Patent: Apr. 5, 2022

(54) DISPLAY DEVICE AND HEAD-UP DISPLAY DEVICE

(71) Applicant: Japan Display Inc., Tokyo (JP)

(72) Inventors: Tsutomu Harada, Tokyo (JP); Shigenori Aoki, Tokyo (JP); Koji Yoshida, Tokyo (JP); Masayuki Mifune, Tokyo (JP); Kazunori Yamaguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 462 days.

(21) Appl. No.: 16/201,330

(22) Filed: Nov. 27, 2018

(65) Prior Publication Data

US 2019/0162960 A1 May 30, 2019

(30) Foreign Application Priority Data

Nov. 28, 2017 (JP) .............................. JP2017-227975

(51) Int. Cl.
| | | |
|---|---|---|
| *G02B 27/01* | (2006.01) | |
| *G02F 1/13357* | (2006.01) | |
| *G02F 1/1335* | (2006.01) | |
| *F21V 8/00* | (2006.01) | |
| *G02F 1/1333* | (2006.01) | |

(52) U.S. Cl.
CPC ....... *G02B 27/0101* (2013.01); *G02B 6/0008* (2013.01); *G02F 1/133308* (2013.01); *G02F 1/133528* (2013.01); *G02F 1/133603* (2013.01); *G02F 1/133605* (2013.01); *G02F 1/133541* (2021.01)

(58) Field of Classification Search
CPC .............. G02B 27/0101; G02B 6/0008; G02F 1/133308; G02F 1/133528; G02F 1/133603; G02F 1/133605

USPC ........................................................ 359/630
See application file for complete search history.

(56) References Cited

U.S. PATENT DOCUMENTS

| | | | | |
|---|---|---|---|---|
| 8,434,909 B2* | 5/2013 | Nichol | ................ | G02B 6/0076 |
| | | | | 362/296.01 |
| 9,992,485 B2* | 6/2018 | Eichenlaub | .......... | G02B 6/0035 |
| 2003/0053033 A1* | 3/2003 | Vrachan | ................ | G02B 30/56 |
| | | | | 353/31 |
| 2003/0086032 A1* | 5/2003 | Yoon | ................ | G02F 1/133528 |
| | | | | 349/96 |
| 2006/0109753 A1* | 5/2006 | Fergason | ............ | H04N 13/337 |
| | | | | 369/30.01 |

(Continued)

FOREIGN PATENT DOCUMENTS

| | | |
|---|---|---|
| JP | 2007-065011 A | 3/2007 |
| JP | 2009-229531 A | 10/2009 |

(Continued)

OTHER PUBLICATIONS

English translation of Japanese Office Action issued in related Japanese Patent Application No. 2017-227975 nailed on Nov. 24, 2021. 5 pages.

*Primary Examiner* — James R Greece
(74) *Attorney, Agent, or Firm* — K&L Gates LLP

(57) ABSTRACT

According to one embodiment, a display device includes a display panel, a backlight device including a plurality of light sources, to irradiate light to the display panel, and an optical element provided on an emission side of the display panel and inclined with respect to a direction perpendicular to an optical axis of the display panel.

6 Claims, 6 Drawing Sheets

(56) References Cited

U.S. PATENT DOCUMENTS

| | | | | |
|---|---|---|---|---|
| 2006/0268407 | A1* | 11/2006 | Fergason | H04N 13/339 359/485.02 |
| 2007/0014127 | A1* | 1/2007 | Hara | G02B 6/005 362/611 |
| 2007/0046874 | A1* | 3/2007 | Adachi | G02F 1/133308 349/122 |
| 2007/0159602 | A1* | 7/2007 | Fergason | G02B 30/25 353/8 |
| 2008/0043490 | A1* | 2/2008 | Coleman | G02F 1/133606 362/623 |
| 2009/0002580 | A1* | 1/2009 | Matsushima | G02F 1/13363 349/12 |
| 2009/0085831 | A1 | 4/2009 | Odoi et al. | |
| 2009/0096937 | A1* | 4/2009 | Bauer | B60R 1/12 348/739 |
| 2009/0303421 | A1* | 12/2009 | Lee | G02F 1/133528 349/96 |
| 2014/0049983 | A1* | 2/2014 | Nichol | G02B 6/0028 362/610 |
| 2014/0267471 | A1 | 9/2014 | Harada et al. | |
| 2015/0286061 | A1* | 10/2015 | Seo | G02F 1/134309 349/15 |
| 2016/0062121 | A1* | 3/2016 | Border | G02B 30/34 359/630 |
| 2016/0109709 | A1* | 4/2016 | Osterhout | G06F 3/013 359/614 |
| 2016/0154244 | A1* | 6/2016 | Border | G02B 5/30 359/630 |
| 2017/0045738 | A1* | 2/2017 | Kim | B60K 35/00 |
| 2017/0168333 | A1* | 6/2017 | Kubota | H01L 27/124 |
| 2019/0179143 | A1 | 6/2019 | Nambara | |

FOREIGN PATENT DOCUMENTS

| | | |
|---|---|---|
| JP | 4788882 B2 | 10/2011 |
| JP | 2014-178369 A | 9/2014 |
| JP | 2015-152732 A | 8/2015 |
| JP | 2015-222337 A | 12/2015 |
| JP | 2016-045244 A | 4/2016 |
| JP | 2017-083699 A | 5/2017 |

\* cited by examiner

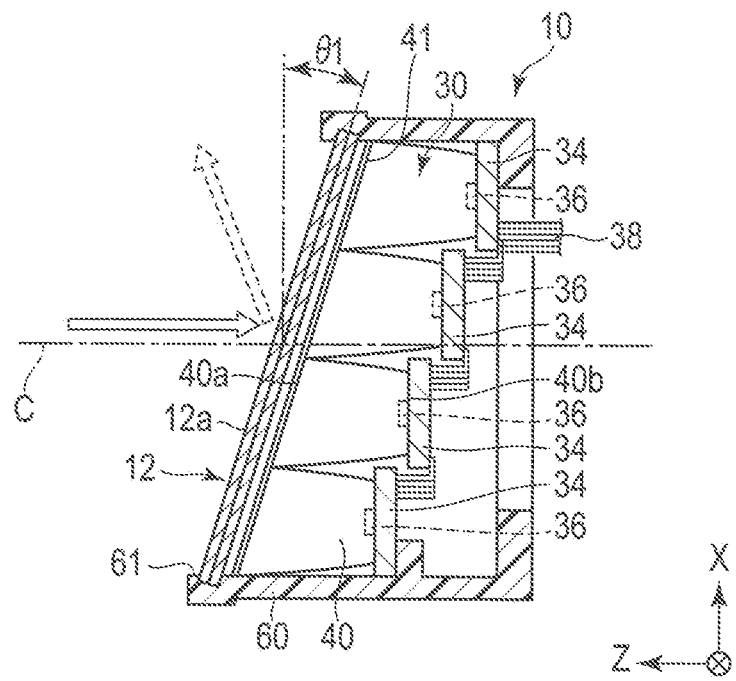
F I G. 9
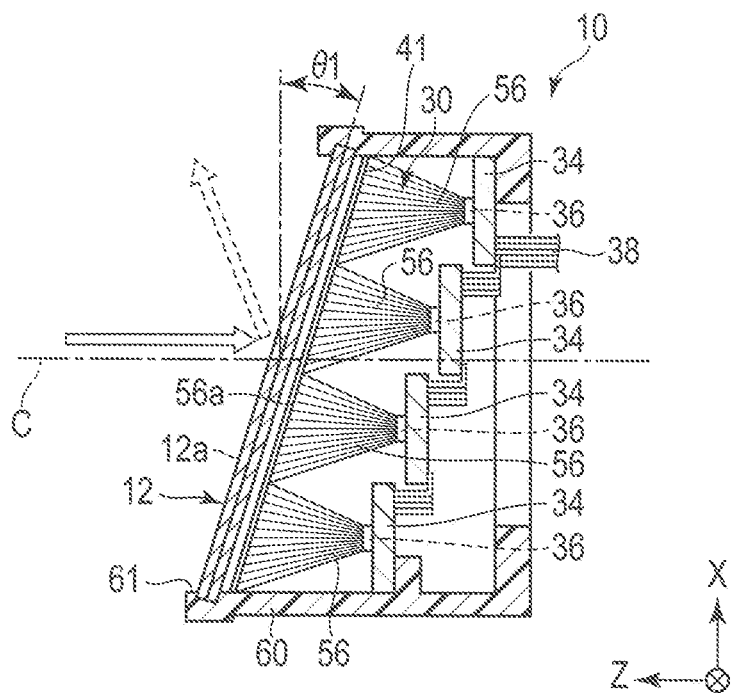
F I G. 10

DISPLAY DEVICE AND HEAD-UP DISPLAY DEVICE

CROSS-REFERENCE TO RELATED APPLICATIONS

This application is based upon and claims the benefit of priority from Japanese Patent Application No. 2017-227975, filed Nov. 28, 2017, the entire contents of which are incorporated herein by reference.

FIELD

Embodiments described herein relate generally to a display device and a head-up display device.

BACKGROUND

In recent years, head-up displays (HUDs), which reflects images on a projection surface such as a windshield of a vehicle to display information in the visual field of the driver, are becoming widespread. The HUD reproduces virtual images in a place about 4 meters-ahead of the windshield, for the driver to be able to check a course guide, emergency information and the like without greatly moving the line of vision, thereby contributing to safely.

Usually, HUDs comprise a liquid crystal panel and an illumination device (backlight device) which irradiates light onto the liquid crystal panel. Images formed on the liquid crystal panel are illuminated and transmitted by the light of the illumination device, and are projected on the windshield to be reflected by the windshield, to form virtual images. In recent years, display devices with less black floating (misadjusted black level), high contrast and low power consumption are being developed with use of an illumination device which can drive with a local dimming drive.

SUMMARY

The present application relates generally to a display device and a head-up display device.

According to one embodiment, a display device includes a display panel, a backlight device including a plurality of light sources, to irradiate light to the display panel, and an optical element provided on an emission side of the display panel and inclined with respect to a direction perpendicular to an optical axis of the display panel.

BRIEF DESCRIPTION OF THE DRAWINGS

FIG. 9 is a cross-sectional view of the display device according to the fourth embodiment.

FIG. 10 is a cross-sectional view of a display device according to a fifth embodiment.

DETAILED DESCRIPTION

Figure 1:
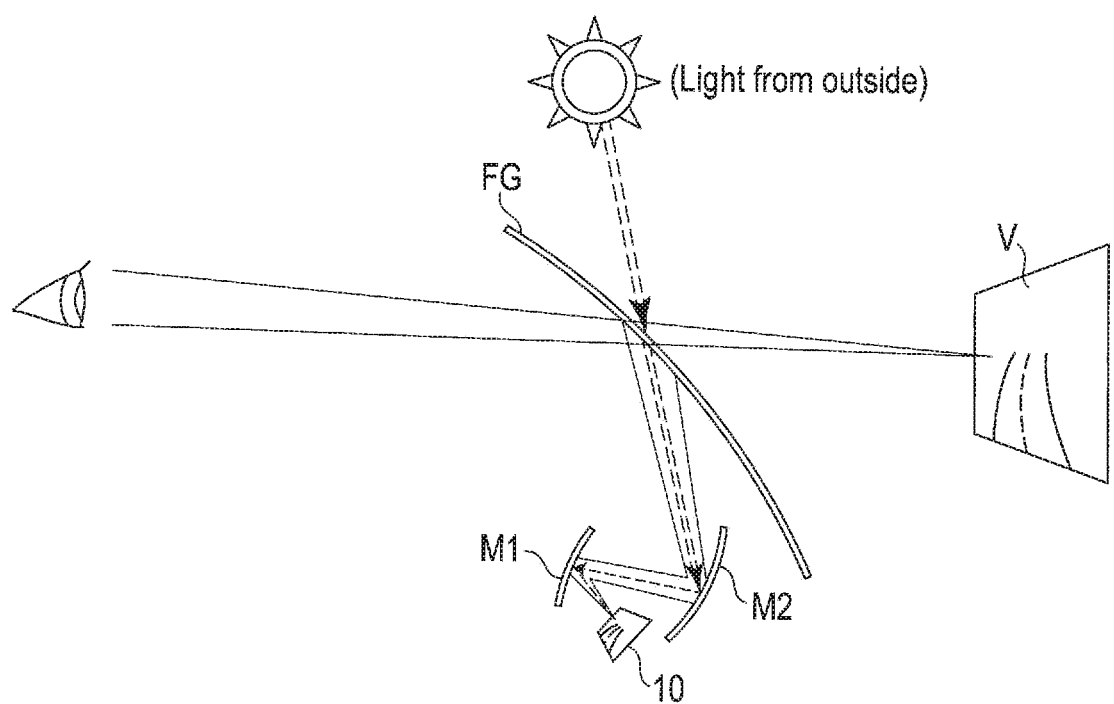
FIG. 1 is a diagram schematically showing a head-up display which employs a display device according to a first embodiment.

Various embodiments will be described hereinafter with reference to the accompanying drawings. In general, according to one embodiment, a display device comprises a display panel, a backlight device including a plurality of light sources, to irradiate light to the display panel and an optical element provided to be inclined with respect to a direction perpendicular to an optical axis of the display panel, on an emission side of the display panel.

The disclosure is merely an example, and proper changes in keeping with the spirit of the invention, which are easily conceivable by a person with ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

When using an HUD under outdoor environment, it is necessary to take into consideration the influence of return light by external light (for example, sun light). For example, the liquid crystal panel is inclined to move the return light of the external light out of the optical axis, thereby avoiding the returning light from reaching the observer's eyes. Note that an optical axis of a light source is perpendicular to an incidence surface 40b of a reflector 40, and an optical axis of a backlight device 30 is also parallel to the optical axis of the light source.

In an HUD employing an illumination device which is driven with a local dimming control, the luminance distribution and the display image need to correspond to each other for every block of the illumination device.

FIG. 1 is a diagram schematically showing a head-up display (head-up display device or HUD) which employs a display device according to a first embodiment. The HUD comprises a liquid crystal display device 10 as a display device for projecting images. The HUD comprises a plurality of, for example, two concave mirrors M1 and M2. A projection image output from the liquid crystal display 10 is reflected and condensed by the concave mirrors M1 and M2, and projected on, for example, an inner surface of a windshield FG of a vehicle as a projection surface. The projected image is reflected towards a driver's side by the windshield FG, to forms a virtual image V several meters ahead of the windshield FG.

Note that the mirrors, which are a part of the HUD, are not limited to a concave type, but may be selected from other optical members such as half mirrors and fresnel mirrors. Moreover, the structure is not limited to a type in which images are directly projected on the windshield FG, but a transparent reflector (projection surface) may be installed in front of the driver to project images on the reflector.

Figure 2:
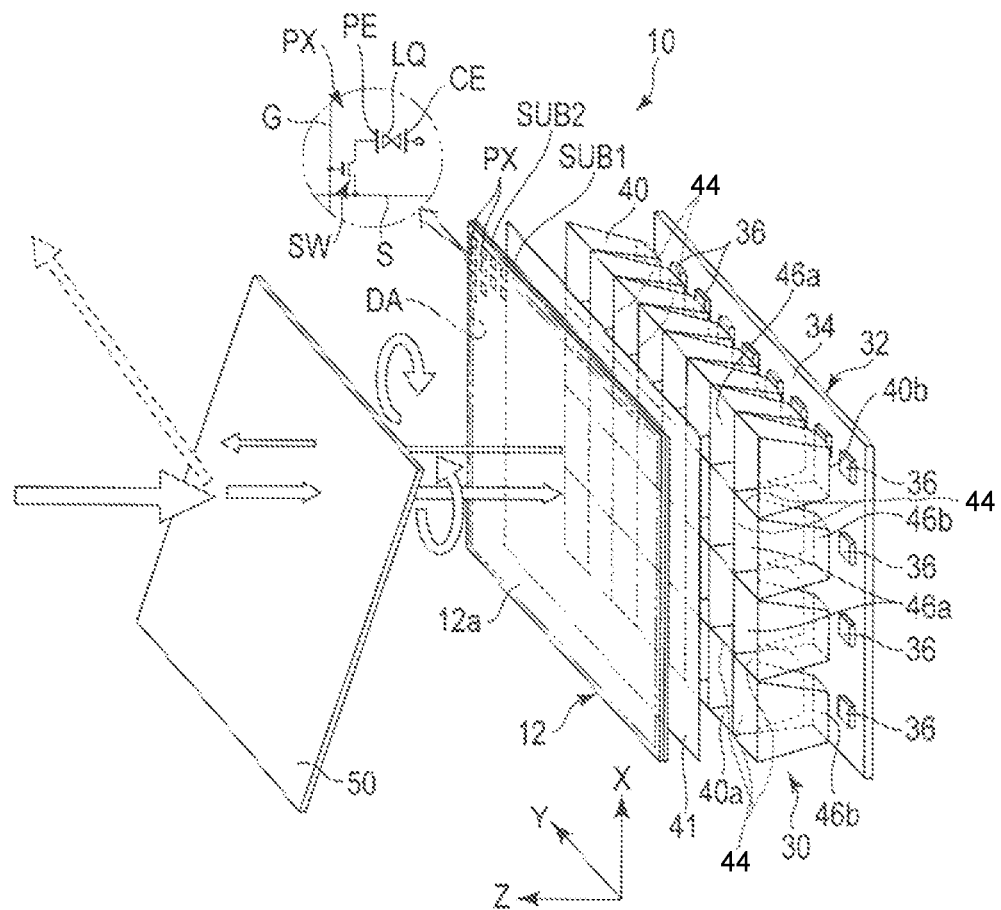
FIG. 2 is an exploded perspective view showing structural elements of the display device.

Next, the liquid crystal display 10 will be described in detail. FIG. 2 is an exploded perspective view of structural elements of the liquid crystal display device, and FIG. 3 is a cross sectional view of the liquid crystal display device.

Figure 3:
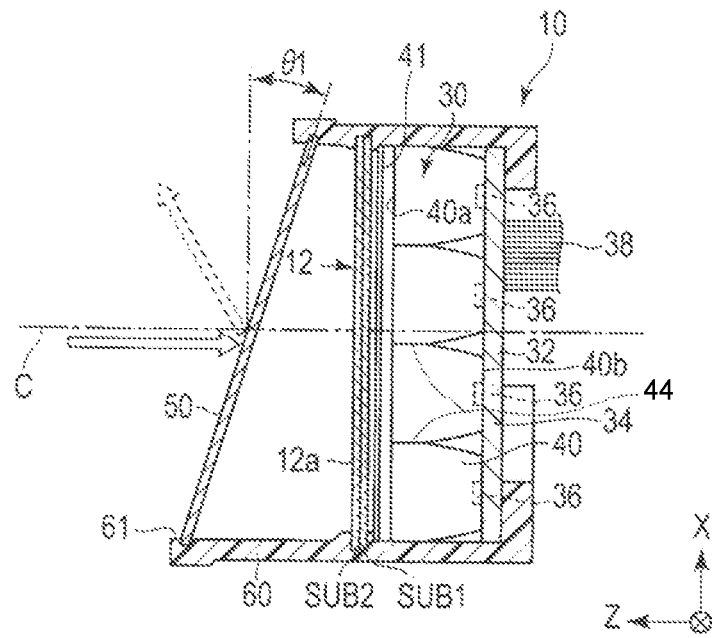
FIG. 3 is a cross-sectional view of the display device.

As shown in FIGS. 2 and 3, the liquid crystal display 10 comprise an active-matrix type liquid crystal display panel 12, a circular polarizer (optical element) 50 provided to oppose a display surface (emission surface) 12a of the liquid crystal display panel 12, an illumination device (backlight device) 30 provided to oppose a rear surface of the liquid crystal display panel 12 (a surface on an opposite side to the display surface 12a), a diffusion sheet 41 provided between the liquid crystal display panel 12 and the backlight device 30, and an outer case 60 accommodating the liquid crystal display panel 12, the backlight device 30 and the circular polarizer 50 while exposing the circular polarizer 50. The backlight device 30 irradiates light onto the rear surface of the liquid crystal display panel 12 via the diffusion sheet 41 to illuminate the liquid crystal display panel 12. As will be described later, the backlight device 30 is configured to execute local dimming which controls the luminance distribution of the backlight device 30 in accordance with the display image by turning on a plurality of light sources simultaneously or individually.

As shown in FIG. 2, the liquid crystal display panel 12 comprises a rectangular first substrate SUB1, a rectangular second substrate SUB2 opposed to the first substrate SUB1, and a liquid crystal layer LQ held between the first substrate SUB1 and the second substrate SUB2. The first substrate SUB1 and the second substrate SUB2 are, for example, insulating substrates such as of glass or resin. The first substrate SUB1 and the second substrate SUB2 are attached together by a frame-shaped sealing member with a predetermined cell gap formed therebetween. The liquid crystal LQ is held in an inner area surrounded by the sealing member in the cell gap.

In the region on the inner side surrounded by the sealing member in plan view(, which is defined as a state of viewing a central portion of the surface of the liquid crystal display panel in a direction perpendicular to the surface of the liquid crystal display panel), a display area (active area) DA is provided to display images. The liquid crystal display panel 12 includes a plurality of pixels PX arrayed in a matrix in the display area DA. As schematically shown in FIG. 3, the first substrate SUB1 comprises, in the display area DA, gate lines G extending in a first direction X, source lines S extending in a second direction Y which crosses the first direction X, switching elements SW electrically connected with the gate lines G and the source lines S in the respective pixels PX, pixel electrodes PE connected respectively to the switching elements SW, and the like. Common electrodes CE of common potential are disposed in the first substrate SUB1 or the second substrate SUB2 so as to oppose the pixel electrodes PE, respectively.

The liquid crystal panel 12 has a transmissive display function of displaying images by selectively transmitting light emitted from the backlight device 30 to the display area DA. The liquid crystal display panel 12 may be configured to be provided for the lateral electric field mode or the vertical electric field.

As shown in FIGS. 2 and 3, the backlight device 30 comprises a light source unit (light source portion) 32 including a plurality of light sources 36, and a reflector 40 provided between the light source unit 32 and the liquid crystal display panel 12, so as to function as a light guide.

The reflector 40 projects the light emitted from the light sources 36 on the liquid crystal display panel 12 by reflecting the light while imparting directivity thereto. Note that in FIG. 3, a longitudinal direction of each of the liquid crystal display panel 12 and the backlight device 30 is defined as an X-axis direction, a width direction is defined as a Y-axis direction and a height direction is defined as a Z-axis direction.

The light source unit 32 includes a rectangular circuit substrate 34 and a plurality of light sources, for example, light-emitting diodes (LEDs) 36, mounted on the circuit substrate 34. The circuit substrate 34 is formed to have substantially the same dimensions (length and width) as those of the liquid crystal display panel 12. For example, thirty two pieces of LEDs 36 are mounted on the circuit substrate 34 to be arranged in a matrix with four columns and eight rows. Each of the LEDs 36 can be formed in various forms such as circular, rectangular and elliptical. For example, each of the LEDs 36 is formed into a rectangular shape. Note that the number of LEDs 36 installed and the arrangement thereof are not limited to those of the example provided above, but may be variously changed in accordance with the dimensions and shape of the liquid crystal display panel 12.

The circuit substrate 34 is connected to the controller (not shown) via the FPC 38. The LEDs 36 are turned on/off independently by the controller. That is, all the LEDs 36 can be turned on simultaneously, or some of the LEDs can be turned on for every block according to the display image for local dimming drive.

As shown in FIG. 2, the reflector 40 comprises a rectangular frame-shaped outer wall having a size substantially equal to that of the liquid crystal display panel 12, and a plurality of partition walls (side walls) 44 arranged to cross each other in a grid on an inner side surrounded by the outer wall. The reflector 40 is integrally molded from, for example, a white synthetic resin (such as polyethylene terephthalate). An inner surface of the outer wall and both surfaces of each of the partition walls each form a reflective surface. The reflector 40 comprises an upper surface serving as an emission surface 40a and a bottom surface serving as an incidence surface 40b. The emission surface 40a has a rectangular shape with substantially the same size as that of the liquid crystal display panel 12.

A plurality of emission openings 46a are made in the emission surface 40a. For example, each emission openings 46a is formed into a rectangular or square shape with four sides. In this embodiment, in accordance with the number of LEDs 36, thirty two emission openings 46a are provided to be arranged in four columns and eight rows. Similarly, in accordance with the number of LEDs 36, thirty two incidence openings 46a are made in the incidence surface 40b so as to be arranged in four columns and eight rows. Moreover, each of the incidence openings 46b is formed at a coaxial position with each corresponding emission opening 46a.

The reflector 40 is placed on the circuit substrate 34 so that a central axis of each emission opening 46a is located coaxial with the optical axis of the corresponding LED 36. Thus, the LEDs 36 are located respectively within the incidence openings 46b of the reflector 40. Light emitted from the LEDs 36 when turned on is repeatedly reflected by the reflective surfaces of the reflector 40 and then emitted from the emission surface 40a via the emission openings 46a.

As shown in FIG. 3, the backlight device 30, the liquid crystal display panel 12 and the circular polarizer 50 are disposed in the outer case 60. The outer case 60 is formed to a rectangular cylinder with an opening (display window) 61 at an axial end thereof. The backlight device 30 is disposed in the outer case 60 with the emission surface 40a thereof facing an opening 61 side. The backlight device 30 is disposed in an axial other end portion (end portion on an opposite side to the opening 61) of the outer case 60. Further, the backlight device 30 is disposed so that an optical axis C thereof is substantially parallel to a central axis of the outer case 60. Thus, the emission surface 40a of the backlight device 30 is substantially perpendicular to the optical axis C.

The liquid crystal display panel 12 is arranged substantially perpendicular to the optical axis C. A rear surface (first substrate SUB1) of the liquid crystal display panel 12 opposes the emission surface 40a of the back light device 30 so as to be substantially parallel thereto. The display surface 12a of the liquid crystal display panel 12 opposes the opening 61. Note that the diffusion sheet 41 is disposed between the emission surface 40a and the liquid crystal display panel 12 so as to oppose an entire surface of the liquid crystal display panel 12.

The circular polarizer 50 is formed into a rectangular shape having a size corresponding to that of the display surface 12a of the liquid crystal display panel 12. The circular polarizer 50 is disposed to oppose the display surface (emission face) 12a of the liquid crystal display panel 12. The circular polarizer 50 is placed near the opening 61 of the outer case 60, to close the opening 61. An entire surface of the circular polarizer 50 is exposed to the outside of the outer case 60 via the opening 61. In this embodiment, the circular polarizer 50 is inclined at an inclination angle θ1 with respect to a direction or plane perpendicular to the optical axis C of the backlight device 30(, which is an optical axis normally crossing the emission surface 40a of the reflector 40). The inclination angle θ1 is, for example, 1 to 30 degrees, preferably, 10 to 25 degrees.

The liquid crystal display panel 12 is provided to be adjacent to an emission surface 40a side with respect to a middle position between the emission surface 40a of the backlight device 30 and the circular polarizer 50 in the central axis of the liquid crystal display panel 12.

According to the display device 10 and the HUD configured as described above, illumination light is applied on the liquid crystal display panel 12 from the backlight device 30 while displaying a desired image on the liquid crystal display panel 12, to output a projection image from the display surface 12a of the liquid crystal display panel 12. The output projection image passes through the circular polarizer 50, and then it is reflected and condensed by the concave mirrors M1 and M2 and projected on an inner surface of the windshield FG which functions as a projection surface. The projected image is reflected towards the driver's side by the windshield FG, to form a virtual image V several meters ahead of the windshield FG as viewed from the driver.

When emitting illumination light, the LEDs 36 are driven by the local dimming manner, in which, for example, those LEDs 36 opposing a black display area are turned off while only those opposing the image display area are on. Thus, it is possible to project high-contrast images with less black floating (misadjusted black level).

As shown in FIGS. 2 and 3, when the circular polarizer 50 is disposed to incline, external light incident on the circular polarizer 50 is reflected in a direction inclined with respect to the optical axis C (indicated by an arrow of dashed line). Therefore, the reflected external light does not reach the observer's eyes. Moreover, the external light (polarization light) having passed through the circular polarizer 50 is partially reflected on the display surface 12a of the liquid crystal display panel 12 so as to be on the optical axis C. But, this reflection light (returning light) is polarized in a reverse rotation, and therefore shielded by the circular polarizer 50. Therefore, the returning light does not enter the observer's eyes.

The liquid crystal display panel 12 opposes the emission surface 40a of the backlight device 30 so as to be substantially parallel thereto. All the incident light beams to the liquid crystal display panel 12 and the emission light beams from the liquid crystal display panel 12 are directed substantially parallel to the optical axis C of the backlight device 30. Therefore, even if the backlight device 30 is driven in the local dimming manner, the gap between the luminance distribution of the illumination light and the display image is suppressed, thereby making it possible to realize clear image display.

As described above, according to the first embodiment, a display device and head-up display free from glare by reflected external light and with improved display quality can be provided.

Next, display devices according to other embodiments and modifications will now be described. In other embodiment and modification which are described below, the same referential numerals are given to the same part as the first embodiment mentioned above, the detailed explanation is omitted or simplified, and it describes in detail focusing on a different part from first embodiment.

Second Embodiment

Figure 4:
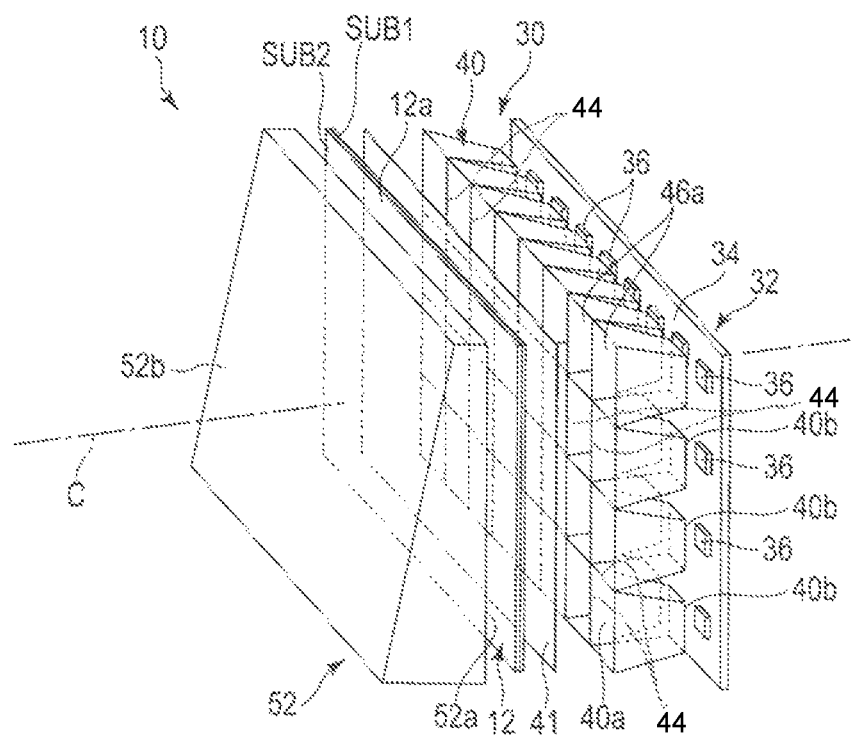
FIG. 4 is an exploded perspective view of a display device according to a second embodiment.
Figure 5:
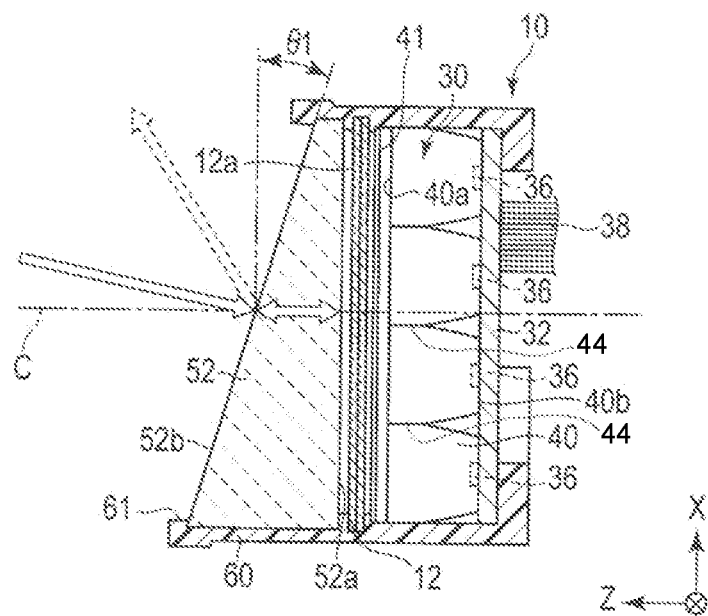
FIG. 5 is a cross-sectional view of the display device according to the second embodiment.

FIG. 4 is an exploded perspective view showing structural elements of a display device according to a second embodiment and FIG. 5 is a cross section of the display device.

As shown in FIGS. 4 and 5, according to the second embodiment, a liquid crystal display 10 comprises a prism 52 in place of the circular polarizer, as an optical element provided on an emission surface side of a liquid crystal display panel 12. The prism 52 is formed into substantially a rectangular block shape. The prism 52 is disposed near an opening 61 of an outer case 60 to close the opening 61. The prism 52 comprises a first surface 52a opposing a display surface (emission surface) 12a of the liquid crystal display panel 12 so as to be substantially parallel thereto, and a second surface 52b opposing the first surface 52a. Substantially an entire surface of the second surface 52b is exposed to the outside of the outer case 60 via the opening 61.

In this embodiment, the second surface 52b of the prism 52 is inclined at an inclination angle θ1 with respect to a direction or plane perpendicular to the optical axis C of the backlight device 30(, which is an optical axis normally crossing the emission surface 40a of the reflector 40). The inclination angle θ1 is, for example, 1 to 30 degrees, preferably, 10 to 25 degrees. Thus, the optical axis C of the backlight device 30 is inclined to a direction of incident light to the second surface 52b of the prism 52, and a direction of emission light from the second surface 52b. The other structures of the display device 10 of the second embodiment are the same as those of the display device of the first embodiment.

According to the liquid crystal display 10 and HUD configured as described above, the second surface of the prism 52 is disposed to incline, and thus the external light entering the prism 52 is reflected in the direction inclined with respect to the optical axis C (direction shown by an arrow of a dashed line). Therefore, the reflected external light does not reach the observer's eyes. Since the optical path for display is refracted by the prism 52, the liquid crystal display panel 12 and the backlight device 30 are arranged so in consideration of the refraction by the prism 52. Further, it is preferable, in consideration of the chromatic aberration by the prism 52, to correct R, G and B data of the image to be displayed on the liquid crystal display panel 12, thereby cancelling the differential chromatic aberration.

The liquid crystal display panel 12 opposes the emission surface 40a of the backlight device 30 so as to be substantially parallel thereto. Therefore, even when the backlight device 30 is driven in the local dimming manner, the gap between the luminance distribution of the illumination light and the display image is suppressed, thereby making it possible to realize clear image display.

As described above, according to the second embodiment as well, a display device and head-up display free from glare by reflected external light and with improved display quality can be provided.

Third Embodiment

Figure 6:
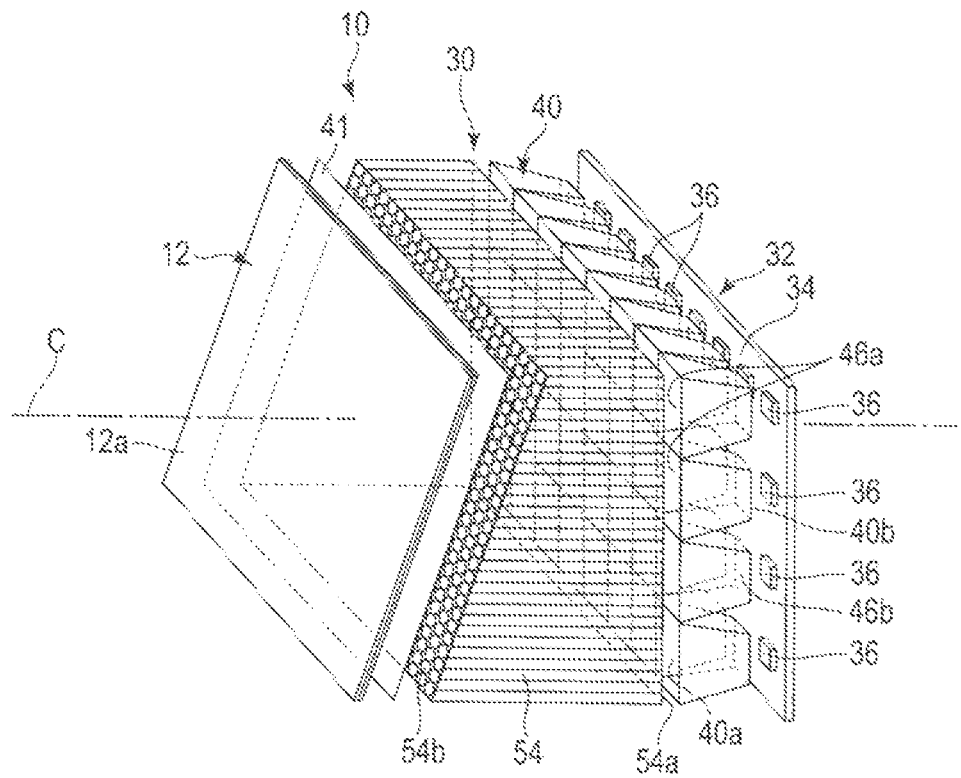
FIG. 6 is an exploded perspective view showing structural elements of a display device according to a third embodiment.
Figure 7:
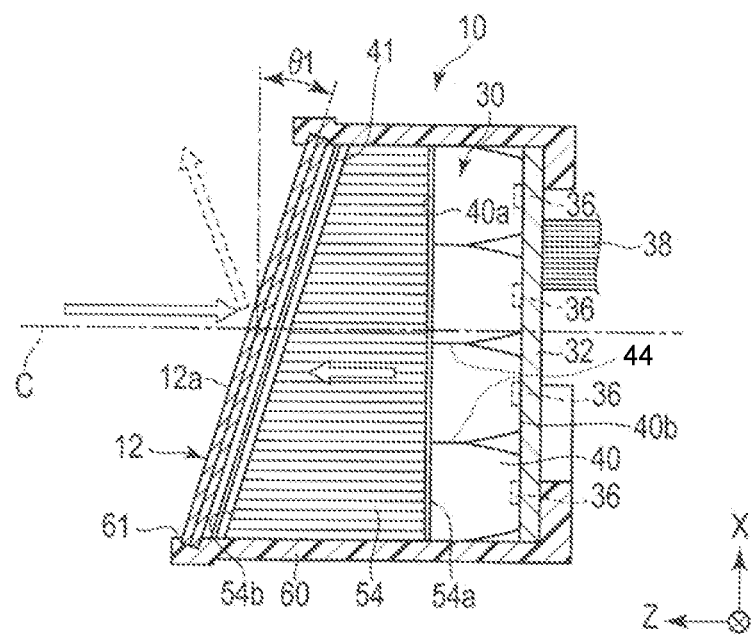
FIG. 7 is a cross-sectional view of the display device according to the third embodiment.

FIG. 6 is an exploded perspective view showing structural elements of a display device according to a third embodiment and FIG. 7 is a cross section of the display device.

As shown in FIGS. 6 and 7, according to the third embodiment, a backlight device 30 of a liquid crystal display 10 comprises an emission surface inclined to a direction or plane perpendicular to the optical axis C. A liquid crystal display panel 12 is disposed substantially parallel to the emission surface of the backlight device 30, that is, to be inclined to a direction perpendicular to the optical axis C. The backlight device 30 comprises a light source unit 32 including a plurality of LEDs 36, a reflector 40 disposed to oppose the LEDs 36, and also a light guide 54 disposed to oppose an emission surface 40a of the reflector 40. The emission surface 40a of the reflector 40 extends normal to the optical axis C.

The light guide 54 comprises a great number of optical fibers bundled into an optical fiber group to have a shape a trapezoidal quadrangular prism. The light guide 54 comprises a first surface (incidence surface) 54a extending perpendicular to the optical axis C, and a second surface (emission surface) 54b opposing the incidence surface 54a. The incidence surface 54a opposes the emission surface 40a of the reflector 40 so as to be adjacent and substantially parallel thereto. The emission surface 54b is inclined at an inclination angle θ1 with respect to a direction or plane perpendicular to the optical axis C. The inclination angle θ1 is, for example, 1 to 30 degrees, preferably, 10 to 25 degrees. The emission surface (second surface) 54b of the light guide 54 constitutes the emission surface of the backlight device 30. A great number of optical fibers each extend parallel to the optical axis C from the incidence surface 54a to the emission surface 54b.

The liquid crystal display panel 12 is provided on an emission side of the light guide 54. The liquid crystal display panel 12 is disposed near an opening 61 of an outer case 60 to close the opening 61. A display surface 12a of the liquid crystal display panel 12 is exposed to the outside of the outer case 60 via the opening 61. The liquid crystal display panel 12 is inclined at an inclination angle θ1 with respect to a direction or plane perpendicular to the optical axis C of the backlight device 30(, which is an optical axis normally crossing the emission surface 40a of the reflector 40). The inclination angle θ1 is, for example, 1 to 30 degrees, preferably, 10 to 25 degrees. Thus, a rear surface of the liquid crystal display panel 12 opposes the emission surface 54b of the light guide 54 so as to be substantially parallel thereto with a slight gap therebetween.

A diffusion sheet (diffusion plate) 41 is provided between the emission surface 54b of the light guide 54 and the liquid crystal display panel 12. The diffusion plate 41 is provided between the liquid crystal display panel 12 and the light guide 54, but the arrangement is not limited to this. It may be located between the incidence surface 54a of the light guide 54 and the emission surface 40a of the reflector 40, or two of the plates may be provided to both of these locations.

The other structures of the display device 10 of the third embodiment are the same as those of the display device of the first embodiment.

According to the display device 10 configured as described above, the illumination light emitted from the reflector 40 of the backlight device 30 is guided parallel to the optical axis C by the light guide 54 comprising the optical fiber group, and is irradiated to the liquid crystal display panel 12 from the emission surface 54b. When the illumination light is irradiated to the liquid crystal display panel 12 from the backlight device 30 while a desired image is being displayed on the liquid crystal display panel 12, a projection image is output from the display surface 12a of the liquid crystal display panel 12. When emitting the illumination light, LEDs 36 are driven by the local dimming manner, in which, for example, those LEDs 36 opposing a black display area are turned off while only those opposing the image display area are on. Thus, it is possible to project high-contrast images with less black floating (misadjusted black level). Further, for example, with such devising that an emission end side of each optical fiber of the optical fiber group (light guide 54) is formed into a spherical surface or the like, the viewing angle can be expanded.

With the liquid crystal display panel 12 disposed to incline, the external light entering the liquid crystal display panel 12 is reflected in the direction inclined with respect to the optical axis C (direction shown by an arrow of a dashed line in FIG. 7). Therefore, the reflected external light does not reach the observer's eyes. Moreover, the emission surface 54b of the light guide 54 extends to incline at the inclination angle θ1, and opposes the liquid crystal display panel 12 so as to be substantially parallel thereto. All the incident light beams to the liquid crystal display panel 12 and the emission light beams from the liquid crystal display panel 12 are substantially parallel to the optical axis C of the backlight device 30. Therefore, even when the backlight device 30 is driven in the local dimming manner, the gap between the luminance distribution of the illumination light and the display image is suppressed, thereby making it possible to realize clear image display.

As described above, according to the third embodiment, a display device and head-up display free from glare by reflected external light and with improved display quality can be provided.

Fourth Embodiment

Figure 8:
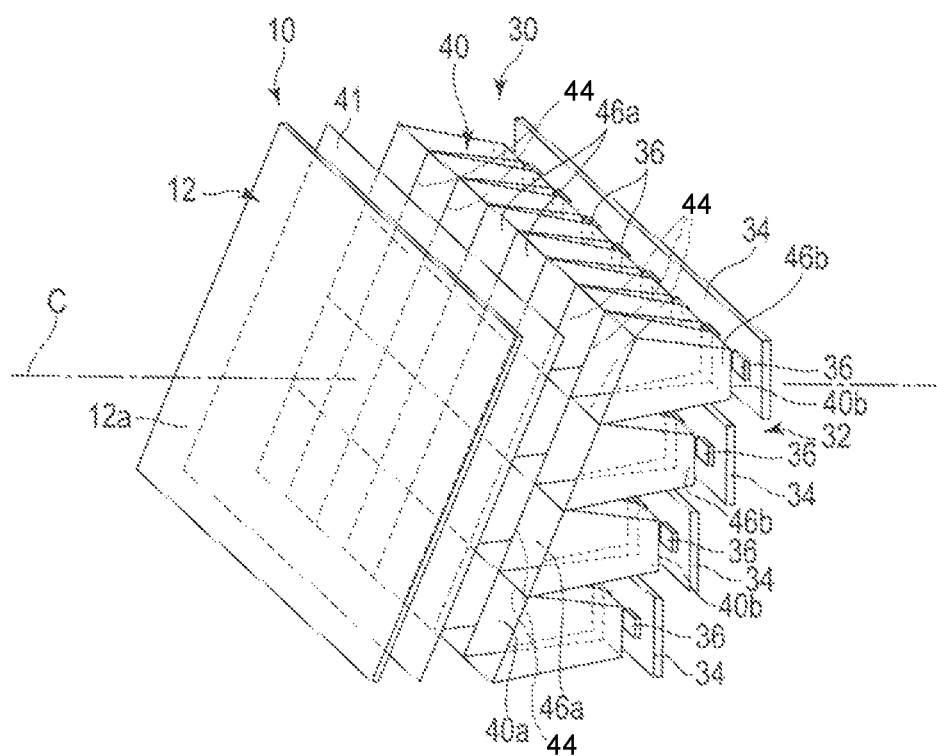
FIG. 8 is an exploded perspective view showing structural elements of a display device according to a fourth embodiment.

FIG. 8 is an exploded perspective view showing structural elements of a display device according to a fourth embodiment and FIG. 9 is a cross section of the display device.

As shown in FIGS. 8 and 9, according to the fourth embodiment, a backlight device 30 of a liquid crystal display 10 comprises an emission surface inclined to a direction or plane perpendicular to the optical axis C. Similarly, a liquid crystal display panel 12 is disposed substantially parallel to the emission surface, that is, to be inclined to a direction or plane perpendicular to the optical axis C.

The backlight device 30 comprises a light source unit 32 including a plurality of LEDs 36, and a reflector 40 disposed to oppose the LEDs 36. The emission surface 40a of the reflector 40 is inclined at an inclination angle θ1 with respect to a direction perpendicular to the optical axis C of the backlight device 30. The inclination angle θ1 is, for example, 1 to 30 degrees, preferably, 10 to 25 degrees. The emission surface 40a of the reflector 40 constitutes the emission surface of the backlight device 30.

Incidence surfaces 40b of the reflector 40 are arranged, for example, steps for every row. A circuit substrate 34 is divided into four rows, and a plurality of, for example, eight LEDs 36 are mounted on the circuit substrate 34 of each row. The circuit substrates 34 of the four rows each extend along a direction substantially perpendicular to the optical axis C, and are arranged in steps. The circuit substrates 34 of the four rows are attached to incidence surfaces 40b of the reflector 40, respectively, and the LEDs 36 are located respectively in incidence openings 46b of the reflector 40. Thus, the position of the light source (LEDs) is changed from one block (row) to another. But, the optical axis C is set to the same as the original direction (so as to make the maximum luminance in the direction of the optical-axis C). The light emitted from each LED 36 is repeatedly reflected by the reflective surface of the reflector 40, and then emitted from the emission surface 40a through the emission opening 46a. The four circuit substrates 34 are connected to a controller (not shown) via an FPC 38. The LEDs 36 are driven on/off independently by the controller, and thus controlled in the local dimming manner.

The liquid crystal display panel 12 is provided on the emission side of the reflector 40. The liquid crystal display panel 12 is provided near an opening 61 of the outer case 60, to close the opening 61. The display surface 12a of the liquid crystal display panel 12 is exposed to the outside of the outer case 60 via the opening 61. The liquid crystal display panel 12 is inclined at an inclination angle θ1 with respect to a direction or plane perpendicular to the optical axis C of the backlight device 30. The inclination angle θ1 is, for example, 1 to 30 degrees, preferably, 10 to 25 degrees. Thus, a rear surface of the liquid crystal display panel 12 opposes the emission surface 40a of the reflector 40 so as to be substantially parallel thereto with a slight gap therebetween. A diffusion sheet (diffusion plate) 41 is provided between the emission surface 40b of the reflector 54 and the liquid crystal display panel 12. The other structures of the display device 10 of the fourth embodiment are the same as those of the display device of the first embodiment.

According to the display device 10 configured as described above, the liquid crystal display panel 12 is disposed to incline, and thus the external light entering the liquid crystal display panel 12 is reflected in the direction inclined with respect to the optical axis C (direction shown by an arrow of a dashed line in FIG. 7). Therefore, the reflected external light does not reach the observer's eyes. Moreover, the emission surface of the backlight device 30, which is, here, the emission surface 40a of the reflector 40, extends to incline at the inclination angle θ1, and opposes the liquid crystal display panel 12 so as to be substantially parallel thereto. All the incident light beams to the liquid crystal display panel 12 and the emission light beams from the liquid crystal display panel 12 are substantially parallel to the optical axis C of the backlight device 30. Therefore, even when the backlight device 30 is driven in the local dimming manner, the gap between the luminance distribution of the illumination light and the display image is suppressed, thereby making it possible to realize clear image display. Moreover, the optical fiber group can be omitted, thus making it possible to reduce the production cost and the size of the device along the direction of the optical axis C (miniaturization).

As described above, according to the fourth embodiment, a display device and head-up display free from glare by reflected external light and with improved display quality can be provided.

Note that in the third and the fourth embodiments described above, the light guide is not limited to an optical fiber or a reflector, but may be formed of a lens.

Fifth Embodiment

FIG. 10 is a cross section of a display device according to the fifth embodiment.

In this embodiment, a plurality of optical fiber groups 56 are used in place of the reflector 40 of the display device 10 according to the fourth embodiment described above. That is, the reflector and the optical fibers are integrated as one structure. Each optical fiber group 56 comprises an emission end which forms an emission surface 56a and an incidence end opposing to be adjacent to the respective LEDs 36. Each optical fiber group 56 guides the light emitted from the LEDs 36 and emits it from the emission surface 56a. The emission surface 56a formed from the emission ends of the optical fiber groups 56 is inclined at the inclination angle θ1 with respect to a direction or plane perpendicular to the optical axis C. The emission surfaces 56a of the optical fiber groups 56 constitute the emission surface of the back light device 30. All the incident light beams to the liquid crystal display panel 12 and the emission light beams from the liquid crystal display panel 12 are directed substantially parallel to the optical axis C of the backlight device 30. The other structures of the display device 10 containing the liquid crystal display panel 12 are the same as those of the display device of the fourth embodiment.

According to the fifth embodiment described above, the function of expanding light emitted from each LED equally to each block is imparted to the optical fiber groups 56, and thus light guides such as a reflector and the like can be omitted. As a result, the weight of the entire display device can be reduced. In addition, also in the fifth embodiment, advantageous effects similar to those of the above-described fourth embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Regarding the embodiments described above, any advantage and effect those will be obvious from the description of the specification or arbitrarily conceived by a skilled person are naturally considered achievable by the present invention.

Based on the structures which have been described in the above-described embodiment and variations, a person having ordinary skill in the art may achieve structures with arbitral design changes; however, as long as they fall within the scope and spirit of the present invention, such structures are encompassed by the scope of the present invention. For example, the structural members of the liquid crystal panel and the backlight device are not limited to rectangular, but may be in some other shape, for example, polygonal of pentagon or more, elliptical, a track-shaped or the like. The materials and dimensions of the structural members are not limited to those of the examples provided above, but may be selected from various options.

In the first to fifth embodiments described above, the outer case 60 may be structured to support the circular polarizer 50, the prism 52 or the liquid crystal display panel 12 at a variable inclination angle. For example, the outer case 60 may be formed to comprise a plurality of groove portions which fixate the circular polarizer 50, the prism 52 or the liquid crystal display panel 12 therein, and such a structure that the circular polarizer 50, the prism 52 and the liquid crystal display panel 12 are fit in trench portions may be selected according to the design of the head-up display.

What is claimed is:

1. A display device comprising:
a display panel; and
a backlight device comprising a plurality of light sources, and a light guide opposing the respective light sources to irradiate light to the display panel,
the light guide comprising a reflector comprising partition walls which partition the respective light sources and a height of the partition walls being different from each other, and an emission surface inclined with respect to a direction perpendicular to an optical axis of the backlight device.

2. The device of claim 1, wherein
the light guide comprises an optical fiber group which guides light emitted from the light sources, and the optical fiber group comprises an emission end which forms the emission surface.

3. The display device of claim 2, wherein
the optical fiber group comprises an incidence end opposing the light sources.

4. The device of claim 1, wherein
the backlight device comprises a light guide which guides the light emitted from the light source, and
the light guide comprises an emission surface inclined to a direction perpendicular to the optical axis of the backlight device.

5. The device of claim 1, wherein
the display panel is inclined with respect to the direction perpendicular to the optical axis of the backlight device.

6. A head-up display device comprising:
a display device of claim 1; and
a projection surface on which a display image of the display device is projected.

* * * * *